United States Patent [19]

Montgomery

[11] 4,271,996
[45] Jun. 9, 1981

[54] PANNIER FOR BICYCLE REAR CARRIER RACKS

[75] Inventor: Joseph S. Montgomery, Stamford, Conn.

[73] Assignee: Cannondale Corporation, Stamford, Conn.

[21] Appl. No.: 25,394

[22] Filed: Mar. 30, 1979

[51] Int. Cl.³ .............................................. B62J 9/00
[52] U.S. Cl. .................................. 224/32 A; 224/31; 150/2.7; 150/28 R
[58] Field of Search ............ 224/209, 210, 151, 46 R, 224/47, 31, 30 A, 30 R, 32 A, 32 R, 36, 39, 41, 42.46 R, 907; 150/2.7, 28 R, 31, 46

[56] References Cited

U.S. PATENT DOCUMENTS

| | | | |
|---|---|---|---|
| 518,270 | 4/1894 | Orth | 224/210 X |
| 2,517,757 | 8/1950 | Adlerstein | 224/210 X |
| 2,542,477 | 2/1951 | Cart | 224/46 R X |
| 3,092,224 | 6/1963 | O'Neil | 224/46 R UX |
| 3,937,374 | 2/1976 | Hine | 224/32 A |
| 3,955,727 | 5/1976 | Montgomery | 224/31 |

FOREIGN PATENT DOCUMENTS

| | | | |
|---|---|---|---|
| 1102369 | 10/1955 | France | 224/32 R |
| 1127921 | 12/1956 | France | 224/32 R |
| 1270435 | 7/1961 | France | 224/31 |
| 82237 | 7/1956 | Netherlands | 224/32 R |

Primary Examiner—Robert J. Spar
Assistant Examiner—Jerold M. Forsberg
Attorney, Agent, or Firm—Brumbaugh, Graves, Donohue & Raymond

[57] ABSTRACT

A pannier for a rear carrier rack on a bicycle carrier rack on a bicycle comprises a bag of flexible, lightweight material and an internal frame having a back part, a top part and a pair of upper side parts, each of which is a network of interconnected ribs. The frame imparts shape and stability to the bag, and the top part has load-supporting capability so that the pannier top serves as a lateral extension of the carrier rack.

5 Claims, 5 Drawing Figures

PANNIER FOR BICYCLE REAR CARRIER RACKS

FIELD OF THE INVENTION

This invention relates to a pannier for bicycle rear carrier racks and, in particular, to a pannier having an internal frame which imparts shape and stability to a lightweight flexible bag and has a top load-supporting part providing a lateral extension of the rack platform.

BACKGROUND OF THE INVENTION

In recent years bicycling has become a very popular recreational and physical-conditioning activity. In one form of recreational bicycling, bicycle touring, it is desirable to equip the bicycle with a rear carrier rack and to use rear carrier rack panniers to carry clothing, food, camping equipmet and the like. Most panniers presently available are lightweight flexible bags which are hung by straps or hooks from the side bars of the rear rack, and although they are gnerally satisfactory if carefully packed, they have only moderate shape stability and are prone to distorting under load, even to the point in extreme cases of careless use of interfering with the rear wheel. A few panniers having internal frames have been marketed, but they have not eliminated the problems that often arise from improper packing.

SUMMARY OF THE INVENTION

There is provided, in accordance with the present invention, an improved rear rack pannier having an internal frame which imparts shape and stability to the bag and provides, as a novel, additional functional aspect, a lateral extension of the carrier rack by means of a structural top part serving as a load-supporting platform.

In particular, a pannier according to the present invention comprises a bag of generally flexible, lightweight material having a top, bottom, front, back and two side walls and a substantially rigid interior frame received within the bag. The frame has a back part having a peripheral portion which matches and engages the perimeter of the back wall of the bag to impart shape and stability to it. Similarly, a top part of the frame matches and engages the top wall of the bag and imparts shape and stability to the bag top. The top and back frame parts are rigidly connected so that the top part has load-supporting ability. Hooks or the like attach the pannier to the side rails of the rear rack with the top of the pannier generally flush with the rack so that sleeping bags, tents or other relatively bulky gear that normally overhangs the sides of the rack is stably supported by the pannier. Two panniers, one on each side, provide an excellent load-supporting surface. Meanwhile, the shaping affect of the frame and the suspension of the bag from the top reduce distortion of the bag walls, especially the back wall. In a preferred form, the frame walls are systems of interconnected ribs spaced relatively closely in a network and keep articles in the bag from distorting the back and top walls of the bag and, in the case of the back wall, possibly interferring with the rear wheel.

The frame preferably has a pair of side parts, each of which is joined to a respective end of the top part and the upper portion of the adjacent side of the back part. Each frame side wall shapes the upper part of the bag side wall and lends rigidity to the support of the top by structurally uniting the top and back parts. A pocket in each bag side wall receives a lower front corner of the adjacent side wall for improved uniting of the bag with the frame.

The frame is best made as a one piece three-dimensional element molded from a substantially rigid, durable polymeric foam, such as polypropylene.

For a better understanding of the invention, reference may be made to the following description of an exemplary embodiment, taken in conjunction with the accompanying figures of three sheets of drawings.

DESCRIPTION OF AN EXEMPLARY EMBODIMENT

Figure 1:
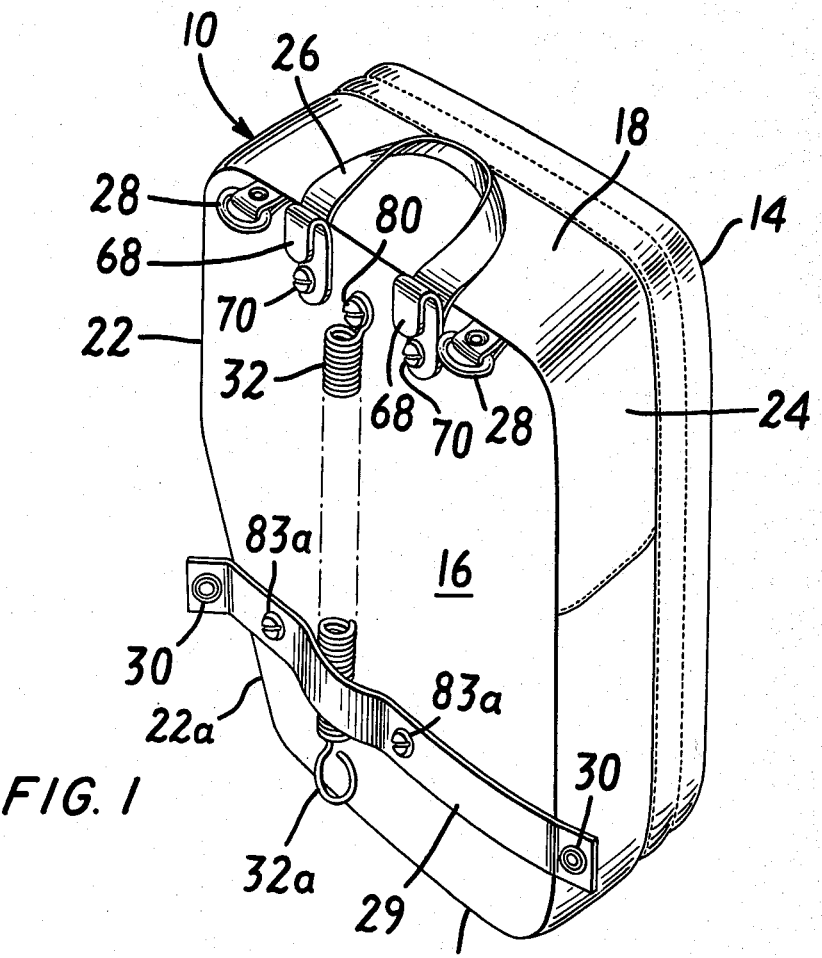
FIG. 1 is a rear pictorial view of the embodiment.
Figure 2:
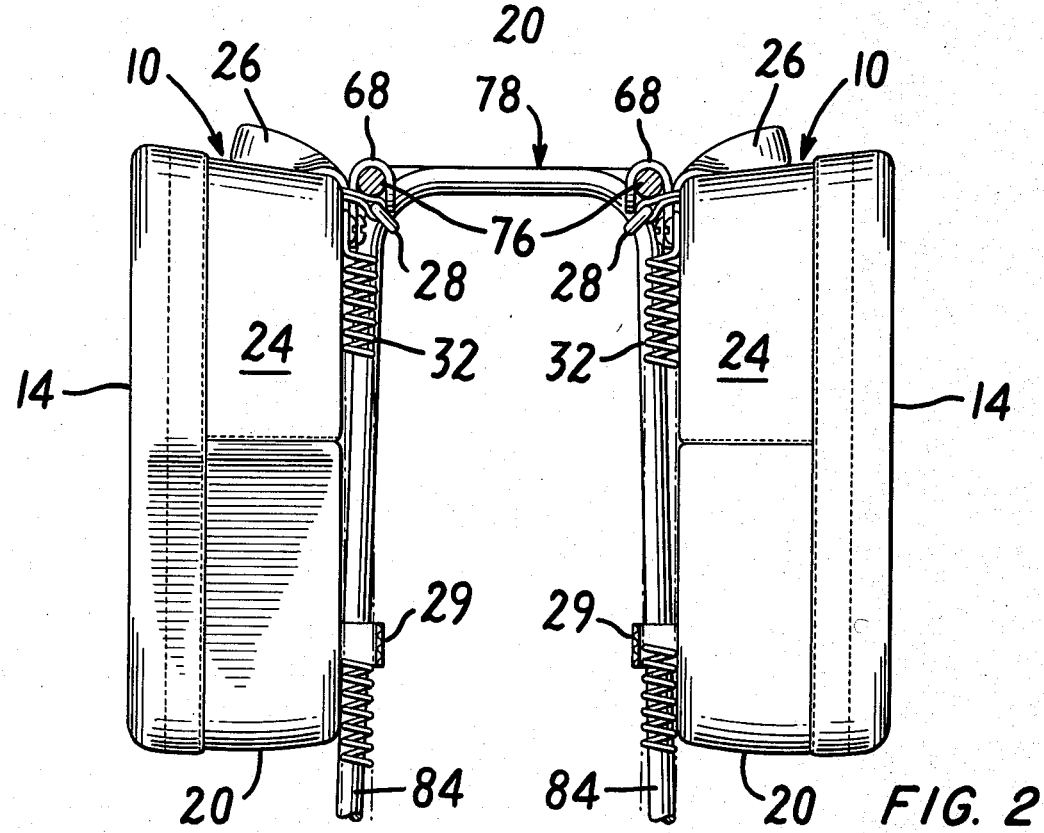
FIG. 2 is a rear elevational view of two panniers of the type shown in FIG. 1 mounted on a rear carrier.

The two principal components of the embodiment are a bag 10 made of a flexible lightweight material, such as a coated nylon oxford cloth, and an internal frame 12. The bag 10 comprises a front wall 14, a back wall 16, a top wall 18, a bottom wall 20 and side walls 22 and 24. External pockets (not shown) may be provided on the front wall and the side walls, and the simple bag shown in FIGS. 1 and 2 is merely exemplary. A zipper along the upper parts of the sides and the top of the front wall permits the bag to be opened by separating a flap. The bag 10 has a carrying handle 26, a pair of D rings 28 for a shoulder strap (which can be used with a single pannier or two panniers joined back to back) adjacent the upper end of the back 16 and a transverse webbing 29 near the part bottom of the back 16 having a snap 30 at each end. Each snap 30 mates with a complementary snap on a second pannier of a pair so that the two panniers of the pair can be snapped together back to back. The webbing 29 also retains a tension spring 32, as described in more detail below. The panniers are preferably made in matched pairs which are right side and left side. The only differences between the panniers of a pair are a diagonal lower section 22a of the forward-facing side walls and the location of any secondary pockets on the side walls.

Figure 3:
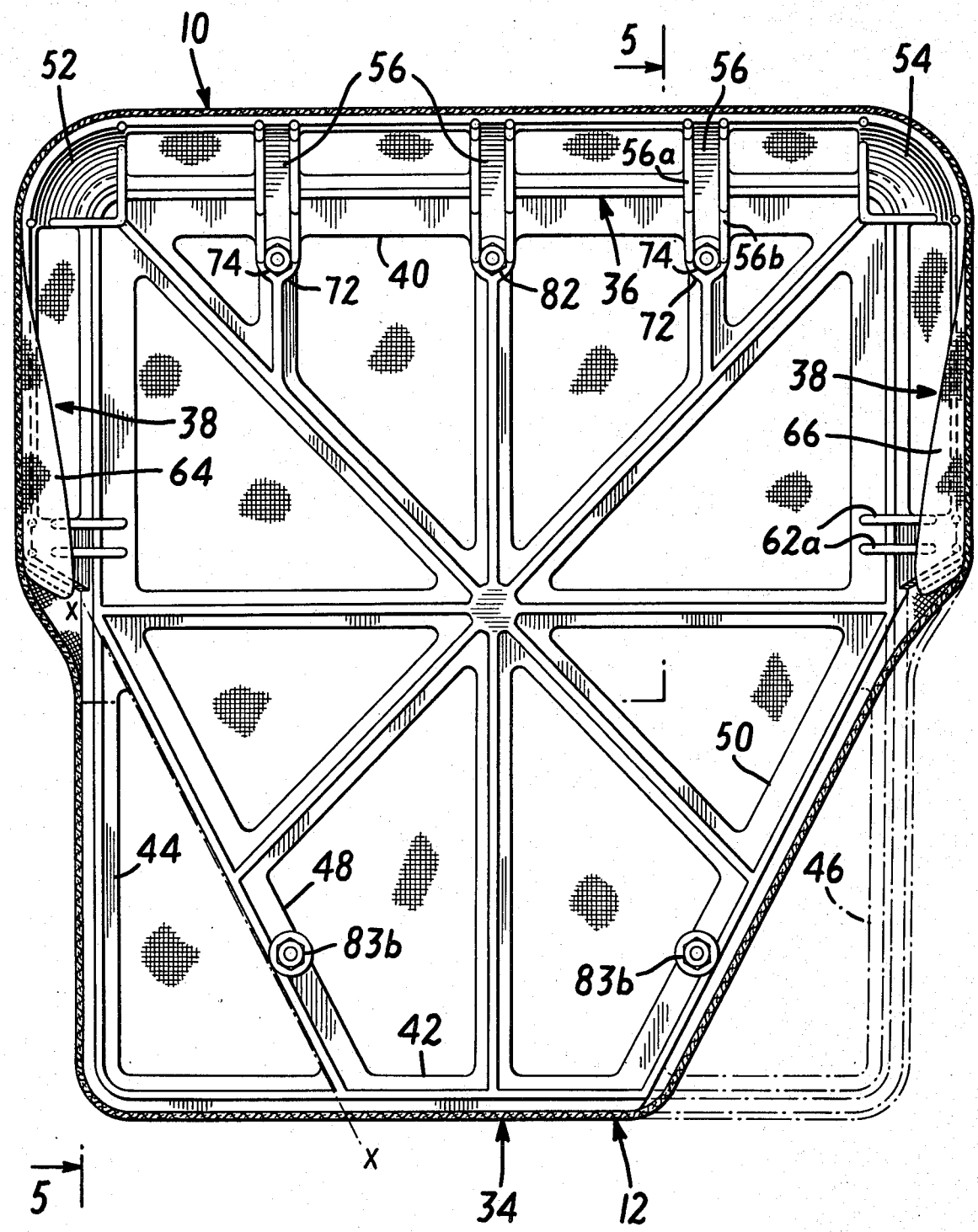
FIG. 3 is a front elevational view of the internal frame and also shows the bag with the front removed.
Figures 4, 5:
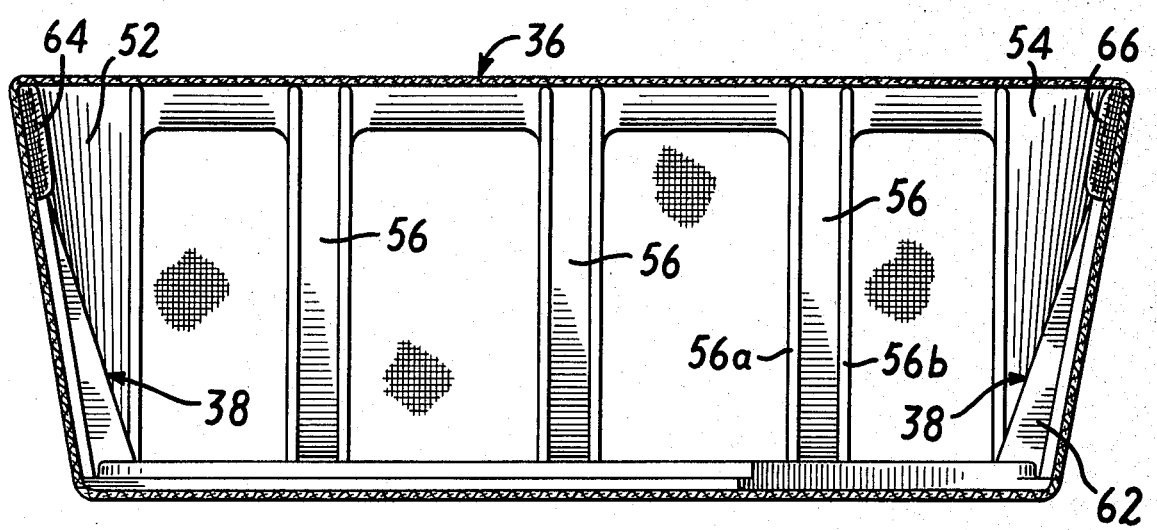
FIG. 4 is a bottom view of the frame and shows the bag with the bottom wall removed.
FIG. 5 is a broken end cross-sectional view of the embodiment taken generally along the lines 5—5 in FIG. 3.

Referring to FIGS. 3 to 5, the internal frame 12 consists of a back part 34, a top part 36 and two side parts 38. The frame has a three-dimensional unitary system of ribs and is injection molded from a substantially rigid polymeric foam, such a polypropylene. Each rib is of U, T or L shape in cross section—the web portions of each rib of each part of the bag are generally coplanar, and the flange portion or portions of each rib project toward the interior of the pannier.

The back part consists of a top rib 40, a bottom rib 42 and two side ribs 44 and 46 interconnected at rounded corners and generally matching and engaging the perimeter of the back wall 16 of the bag 10, thus to impart shape and stability to the back wall. A pair of diagonal ribs 48 and 50 extend upwardly and outwardly from the bottom rib 42 to the respective side ribs 44 and 46. In the finished pannier, either the right or the left lower corner of the frame 34 is cut away (see the dot-dash line labelled "X" in FIG. 3). The peripheral ribs of the back part are interconnected by a system of vertical, horizontal and diagonal ribs, thus to produce a structural system having relatively high strength and rigidity but of relatively light weight. Objects placed in the pannier will generally rest against one or more ribs and will be prevented by the ribs from distorting the back wall 16 of the bag 10.

The top part 36 of the frame comprises a relatively large rib 52, 54 at each side, each of which is a curved web of generally uniform thickness and of somewhat conical shape. Three generally U-shaped ribs 56 extend out from the top rib 40 of the back part 34 of the frame. The flange portions 56*a* and 56*b* are of relatively large height adjacent the rear part and taper outwardly (see FIG. 5), thus to impart relatively high strength and rigidity in the manner of a cantilevered beam. A front rib 58 connects the front ends of the ribs 52, 54 and 56 and provides the front of the perimeter of the top part. The ribs 40, 52, 54 and 58 define the perimeter of the top part and match and engage the top wall 18 of the bag to impart shape and stability to the top of the bag.

Each side part 38 of the frame comprises a front rib 60 and a lower rib 62. The lower rib 62 is stiffened by a pair of flanges 62*a* which are of increasing height in the rearward direction, thus to support the rib 62 in cantilevered relation to the side ribs 44 and 46 of the back part of the system. A pocket 64, 66 sewn inside each of the side walls 22 and 24 of the bag 10 fits over the lower front corner of each side part of the frame, thus uniting each side wall to the side frame for shaping and stabilizing of the upper portions of the side walls of the bags. The side parts 38 strengthen the support of the top wall.

Two hooks 68 are fastened to the pannier near the top of the back wall 16 by screws 70 which pass through the bag and small bosses 72 on the frame and received by nuts 74. As may best be seen in FIG. 2, the hooks 68 fit over the side rails 76 of a rear carrier rack 78. The upper end of the spring 32 is fastened to the back part of the frame by a screw 80 and a nut 82 (see FIGS. 1 and 3). In addition to stitching the webbing 29 to the bag 10, the webbing is joined to the frame by screws 83*a* and nuts 83*b*, and the spring 32 passes between the webbing 29 and the back wall 16 of the bag 10. A hook 32*a* at the lower end of the spring 32 is received by a clip fastened to the bicycle near the rear wheel axle (not shown). When so mounted (FIG. 2), the springs 32 are extended under tension and securely hold the panniers down on the rack. The webbing 29 behind the spring holds the lower part of the pannier generally in against the supporting struts 84 of the rack, but the spring system of restraint greatly reduces shock forces on the bag by yielding under abrupt motion.

The top of each of a pair of panniers mounted on the rack lies generally flush with the carrier portion of the rack and, therefore, provides a lateral extension of the rack. The top part 36 of the internal frame of the pannier has a relatively large load-supporting ability. The back parts of the internal frames rest against the supporting struts 84 of the rack 78, and the top and side parts of the frame constitute a cantilevered structure. The overhanging parts of relatively bulky gear, for example, sleeping bags and tents, are carried by such cantilevered structures. The cantilevered structures also suspend the bags and the objects carried in the bags; the top and the two side parts of the frame make up an inverted U-shaped (when viewed from the front) roof from which the front and side walls hang and by which their shapes tend to be established under an internal load.

I claim:

1. A pannier for a rear carrier rack of a bicycle or the like comprising a bag of generally flexible lightweight material having a top wall, a back wall, a front wall, a bottom wall and a pair of side walls, an essentially rigid, unitary interior frame received within the bag which includes a back part having a peripheral portion matching and engaging the perimeter of the rear wall of the bag to impart shape and stability thereto, and a top part substantially rigidly connected to the upper edge of the rear part, extending out at substantially a right angle to a plane defined by the peripheral portion of the rear part and having a peripheral portion substantially matching and engaging the perimeter of the top wall of the bag to impart shape and stability thereto, and two side parts substantially rigidly connected to the two side edges of the rear part, extending out at substantially a right angle to planes defined by both the peripheral portions of the rear and top parts and extending only partly down the side walls from the top to impart shape and stability to the upper side walls and permit the bottom portions of the front and side walls to assume the shape of the contents of the pannier, the interior space of the pannier thus being entirely uninterrupted side to side and top to bottom, and attaching means joined to the frame adjacent the juncture between the rear part and top part and adapted to mount the pannier on the rack with the top wall of the bag lying generally contiguous to the rack platform, the top part of the frame thus constituting a structural element for supporting part of an object carried on the rack platform and for supporting the bag and objects within it.

2. A pannier according to claim 1 wherein each side wall of the bag includes a pocket which receives a lower front corner portion of a corresponding side part of the frame for uniting the bag with the frame.

3. A pannier according to claim 1 wherein the top and back parts of the frame are composed of interconnected ribs defining openings.

4. A pannier according to claim 1, or 3 wherein the frame parts are unitary elements of a one-piece three-dimensional member molded from a polymeric material.

5. A pannier according to claim 4 wherein the polymeric material is a polypropylene foam.

* * * * *